United States Patent [19]

Douglas

[11] Patent Number: 5,484,977
[45] Date of Patent: Jan. 16, 1996

[54] METHOD OF MANUFACTURING AN ARTICLE BY SUPERPLASTIC FORMING AND DIFFUSION BONDING AND VACUUM CHAMBER FOR USE IN PROCESSING WORKPIECES FOR SUPERPLASTIC FORMING AND DIFFUSION BONDING

[75] Inventor: Joseph Douglas, Derby, England

[73] Assignee: Rolls-Royce, plc, United Kingdom

[21] Appl. No.: 112,984

[22] Filed: Aug. 30, 1993

Related U.S. Application Data

[62] Division of Ser. No. 53,335, Apr. 28, 1993, Pat. No. 5,263,638, which is a continuation of Ser. No. 881,266, May 11, 1992, abandoned.

[30] Foreign Application Priority Data

Jun. 4, 1991 [GB] United Kingdom ............... 9111954

[51] Int. Cl.⁶ .............................................. B23K 15/00
[52] U.S. Cl. ............................. 219/121.13; 219/121.63; 228/118; 228/157
[58] Field of Search ...................... 219/121.11, 121.12, 219/121.13, 121.14, 121.21, 121.28, 121.31, 121.63, 645; 228/118, 157; 29/889.72

[56] References Cited

U.S. PATENT DOCUMENTS

| | | | |
|---|---|---|---|
| 3,842,236 | 10/1974 | Von Walter | 219/121.31 |
| 3,980,220 | 9/1976 | Wolfe et al. | 228/160 |
| 4,220,276 | 9/1980 | Weiser et al. | 228/118 |
| 4,379,218 | 4/1983 | Grebe et al. | 219/121.14 |
| 4,474,044 | 10/1984 | Leistner et al. | 72/13 |
| 4,500,033 | 2/1985 | Schulz et al. | 228/219 |
| 4,549,685 | 10/1985 | Paez | 228/118 |
| 4,811,890 | 3/1989 | Dowling et al. | 228/157 |
| 5,024,368 | 6/1991 | Bottomley et al. | 228/118 |
| 5,024,369 | 6/1991 | Froes | 228/157 |
| 5,049,718 | 9/1991 | Spletter et al. | 219/121.64 |
| 5,069,383 | 12/1991 | Cooper et al. | 228/157 |
| 5,226,578 | 7/1993 | Douglas | 228/157 |
| 5,263,638 | 11/1993 | Douglas | 228/118 |
| 5,273,202 | 12/1993 | Douglas | 228/44.3 |
| 5,323,536 | 6/1994 | Fowler et al. | 29/889.72 |

*Primary Examiner*—Tu Hoang
*Attorney, Agent, or Firm*—Cushman Darby & Cushman

[57] ABSTRACT

A stack of titanium sheets are placed on a worktable in a vacuum chamber. One of the mating surfaces of each pair of mating surfaces has had a stop off material applied in a desired pattern to prevent diffusion bonding. A pump evacuates the vacuum chamber and heaters heat the stack to evaporate volatile binder from the stop off. When all the binder has been removed the worktable is moved relative to an electron beam from a gun to weld the edges of the sheets together to form a sealed assembly. The volatile binder is removed quickly and oxidation of the titanium is prevented during baking out of the binder. The sealed assembly is then heated and externally pressurised to diffusion bond the sheets together. The integral structure is then heated and internally pressured to superplastically form one of the sheets to produce an article of predetermined shape.

13 Claims, 4 Drawing Sheets

METHOD OF MANUFACTURING AN ARTICLE BY SUPERPLASTIC FORMING AND DIFFUSION BONDING AND VACUUM CHAMBER FOR USE IN PROCESSING WORKPIECES FOR SUPERPLASTIC FORMING AND DIFFUSION BONDING

This is a division of application Ser. No. 08/053,335, filed Apr. 28, 1993, now U.S. Pat. No. 5,263,638 which is a continuation of 07/881,266, filed May 11, 1992, abandoned.

FIELD OF THE INVENTION

The present invention relates to a method of manufacturing an article by superplastic forming and diffusion bonding.

BACKGROUND OF THE INVENTION

It is known to manufacture metallic articles by superplastic forming and diffusion bonding metal workpieces. These metal workpieces include elementary metal, metal alloys and metal matrix composites. At least one of the metal workpieces must be capable of superplastic extensions.

The surfaces of the workpieces to be joined are cleaned, and at least one surface of one or more of the workpieces is coated in preselected areas with a material to prevent diffusion bonding. The workpieces are arranged in a stack and the edges of the workpieces are welded together, except where a first pipe is welded to the workpieces, to form an assembly. The assembly is placed in an autoclave and heated so as to "bake out" the binder from the material used to prevent diffusion bonding. The assembly is then evacuated via the pipe and the pipe is sealed. The sealed assembly is placed in a pressure vessel and is heated and pressed to diffusion bond the workpieces together to form an integral structure. Diffusion bonding occurs when two mating surfaces are pressed together under temperature, time and pressure conditions that allow atom interchange across the interface. The first pipe is removed and a second pipe is fitted to the diffusion bonded assembly in place of the first pipe assembly. The integral structure is located between appropriately shaped dies and is placed within an autoclave. The integral structure and dies are heated and pressurized fluid is supplied through the second pipe into the interior of the integral structure to cause at least one of the workpieces to be superplastically formed to produce an article matching the shape of the dies.

In the known method the welding of the pipe, for subsequently removing vaporised binder and for evacuating the assembly, to the workpieces is time consuming. The use of the pipe for removing vaporised binder from the assembly is also time consuming. Furthermore the assembly may contain air when it is heated to vaporise the binder and may result in oxidation of the surfaces of the workpieces which are subsequently to be diffusion bonded.

The present invention seeks to provide a novel method of manufacturing an article by superplastic forming and diffusion bonding which does not have the above mentioned disadvantages.

SUMMARY OF THE INVENTION

Accordingly the present invention provides a method of manufacturing an article by superplastic forming and diffusion bonding at least two metal workpieces comprising the steps of (a) applying a stop off material to prevent diffusion bonding to preselected areas of at least one of the surfaces of at least one of the at least two metal workpieces, (b) assembling the at least two workpieces into a stack relative to each other so that the surfaces are in mating abutment, (c) placing the stack in a vacuum chamber, (d) evacuating the vacuum chamber (e) heating the stack while it is within the vacuum chamber to evaporate volatile binder from the stop off material while continuously evacuating the vacuum chamber to remove the volatile binder from between the at least two workpieces and the vacuum chamber, (f) welding the edges of the at least two workpieces while the stack is within the vacuum chamber to provide a sealed assembly, (g) applying heat and pressure across the thickness of the at least two workpieces to diffusion bond the at least two workpieces together in areas other than the preselected areas to form an integral structure, (h) heating the integral structure and internally pressurizing it to cause the preselected areas of at least one of the workpieces to be superplastically formed to produce an article of predetermined shape.

The stack is preferably heated to a temperature between 250° C. and 350° C. to evaporate the volatile binder from the stop off material.

The edges of the at least two workpieces are preferably welded using an electron beam.

Where the workpieces are made of a titanium alloy, the workpieces are heated to a temperature equal to or greater than 850° C. and the pressure applied is equal to or greater than 294 lbs per square inch to diffusion bond the workpieces together to form an integral structure.

Preferably the workpieces are heated to a temperature between 900° C. and 950° C. and the pressure applied is between 294 lbs per square inch and 441 lbs per square inch.

The integral structure is heated to a temperature equal to or greater than 850° C. to superplastically form the integral structure.

Preferably the integral structure is heated to a temperature between 900° C. and 950° C.

The present invention also provides a vacuum chamber for use in processing at least two metal workpieces for diffusion bonding and superplastic forming comprising pump means arranged to evacuate the vacuum chamber, an energy beam welding means, heater means arranged to heat a stack of at least two metal workpieces placed in the vacuum chamber to evaporate volatile binder from a stop off material applied to preselected areas of at least one of the mating surfaces of the metal workpieces, means arranged to cause relative movement between the welding beam of the energy beam welding means and any stack of workpieces placed in the vacuum chamber to allow the edges of the at least two metal workpieces to be welded together.

Preferably the vacuum chamber is a combined vacuum chamber and autoclave, the vacuum chamber comprises a pressure vessel arranged to contain internal pressures from a vacuum to at least 294 lbs per square inch.

Preferably the pressure vessel is arranged to contain internal pressures up to 441 lbs per square inch.

Preferably the means to cause relative movement between the welding beam and the stack of workpieces comprises a worktable movable in two mutually perpendicular directions, the stack of workpieces is locatable on the worktable.

Preferably the energy beam welding means comprises an electron beam gun.

Preferably the vacuum chamber comprises a first portion in which the worktable and heating means are located and a second portion in which the electron beam gun is located.

Preferably valve means positioned between the first and second portions selectively isolates the electron beam gun from the first portion of the vacuum chamber.

The energy beam welding means may comprise a laser beam gun.

Preferably the heating means comprises a plurality of radiant heaters.

Preferably a plurality of reflectors are provided to reflect radiant heat onto the workpieces.

The heating means may comprise a plurality of inductive heaters.

The inductive heaters may be mounted on the worktable.

BRIEF DESCRIPTION OF THE DRAWINGS

The present invention will be more fully described by way of example with reference to the accompanying drawings, in which.

DETAILED DESCRIPTION OF THE INVENTION

Figure 4:
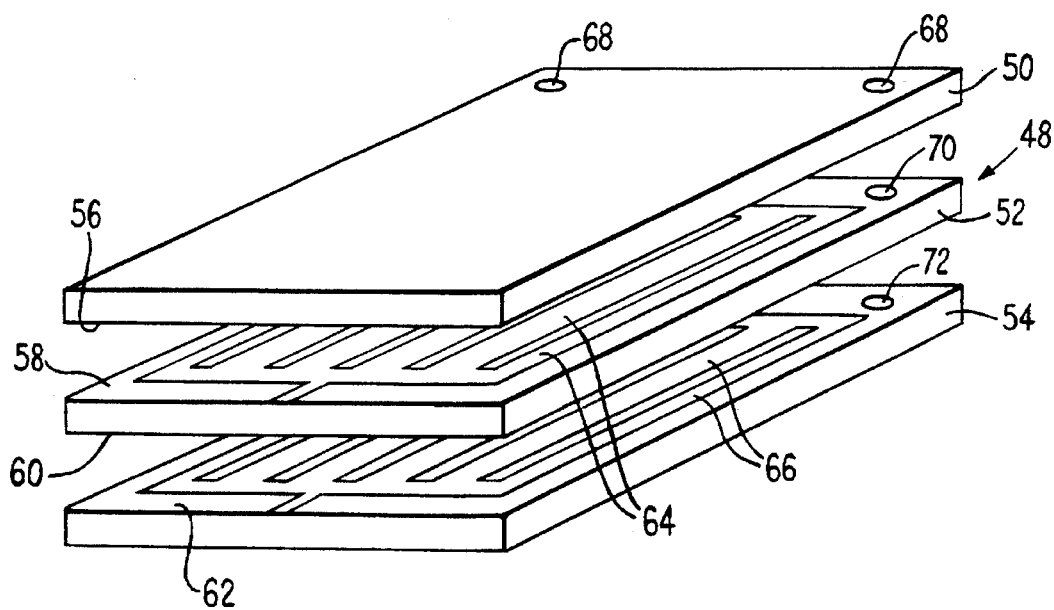
FIG. 4 illustrates an exploded view of a stack of workpieces which are superplastically formed and diffusion bonded to form an article according to the present invention.

In FIG. 4, three sheets of titanium alloy 50,52 and 54 are assembled into a stack 48.

Prior to assembling the sheets 50,52 and 54 into the stack 48, the mating surfaces 56,58 60 and 62 of the sheets 50,52 and 54 are prepared for diffusion bonding by chemical cleaning. One of the mating surfaces 56 and 58 in this example, mating surface 58, has had a stop off material applied, and one of the mating surfaces 60 and 62, in this example mating surface 62, has had a stop off material applied. The stop off may comprise powdered yttria in a binder and solvent e.g. the stop off known as "Stopyt 62A" which is sold by an American company named GTE Service Corporation.

The stop off material is applied in desired patterns 64 and 66, shown as the shaded areas in FIG. 4, by the known silk screen printing process. The desired patterns 64 and 66 of stop off material prevent diffusion bonding between preselected areas of the sheets 50,52 and 54. In this example the stop off is applied in straight lines, but it may be applied as dots or other suitable patterns depending on the particular article to be manufactured. The three sheets of titanium alloy 50,52 and 54 are then assembled into the stack 48. The sheet 50 has a pair of dowel holes 68 which are axially aligned with corresponding dowel holes 70 in sheet 52 and with corresponding dowel holes 72 in sheet 54 to ensure the correct positional relationship between the three sheets 50,52 and 54 in the stack 48. The sheets 50,52 and 54 are maintained in this positional relationship by a pair of dowels (not shown) which are inserted in the axially aligned dowel holes 68,70 and 72.

The stack 48 is then placed in a vacuum chamber, which will be more fully described later in this specification. The vacuum chamber is evacuated and then the stack 48 is heated to a temperature between 250° C. and 350° C. to bake out, or evaporate the binder from the stop off material. During the baking out of the binder, the vacuum chamber is continuously evacuated to remove the binder from between the sheets and from the vacuum chamber. After the binder has been removed, which is determined either by monitoring the binder levels in the gas extracted from the vacuum chamber or by maintaining the vacuum chamber at the temperature between 250° C. and 350° C. for a predetermined time, the edges of the titanium sheets are welded together, in this example by an electron beam, to provide a sealed assembly. The pressure in the vacuum chamber is then allowed to return to atmospheric pressure.

The heating of the un-welded stack of sheets in the continuously evacuated vacuum chamber enables the volatile full binder to be removed from the stack throughout the periphery of the stack, along all edges of the sheets. This allows the volatile binder to be removed much quicker than in the previously known method. This too dispenses with the need to fit a pipe to the stack and hence there is a time saving. Furthermore by heating the un-welded stack of sheets in the continuously evacuated vacuum chamber, there is no air present in the vacuum chamber to oxidize the surfaces of the sheets.

The sealed assembly is removed from the vacuum chamber and is transferred to an autoclave. The sealed assembly is preferably removed from the vacuum chamber by a robotic arm and is automatically transferred to and placed in the autoclave without manual intervention. Manual handling of the sealed assembly between the vacuum chamber and the autoclave is undesirable because the stop off is brittle and easily damaged.

The temperature in the autoclave is increased such that the sealed assembly is heated to a temperature greater than 850° C. and the argon pressure in the autoclave is raised to greater than 20 atmospheres, 294 pounds per square inch ($20.26 \times 10^5$ $Nm^{-2}$) and held at that temperature and pressure for a predetermined time. Preferably the sealed assembly is heated to a temperature between 900° C. and 950° C. and the pressure is between 294 pounds per square inch ($20.26 \times 10^5$ $Nm^{-2}$) and 441 pounds per square inch ($30.39 \times 10^5$ $Nm^{-2}$). For example if the sealed assembly is heated to 925° C. and the pressure is raised to 300 lbs/sq.in the temperature and pressure are held constant for about 2 hours. The pressure is then reduced to ambient, diffusion bonding having been achieved and the sealed assembly, which is then an integral structure, is removed.

A pipe is fitted to the integral structure, and argon is introduced into the areas, within the integral structure, containing the stop off in order to break the adhesive grip which the diffusion bonding pressure has brought about. The argon is carefully introduced to those areas which contain the stop off, and the argon seeps through the stop off and eventually reaches the opposing end of the integral structure. The argon may initially be caused to travel between one pair of workpieces and on reaching the opposite end return to the inlet end between another pair of workpieces. In any event, the argon must travel the whole length of the interior of the integral structure such as to break the adhesive grip between the stop off and the sheets brought about during the diffusion bonding step.

This step is carried out at room temperature because the metal is elastic at room temperature and the minimal extension which occurs does not go beyond the elastic limit. Consequently, the integral structure regains its shape when pressure is removed at the end of the step. If this step is attempted whilst the structure is at the common diffusion bonding and superplastic forming temperature, there is a serious risk of progressive plastic deformation lengthwise of the integral structure, rather than simultaneous deformation over the whole structure. In such circumstances, rupturing of the integral structure frequently occurs.

The integral structure is placed between appropriately shaped split dies positioned within an autoclave which is then evacuated so as to avoid contamination of the titanium integral structure.

The integral structure is again heated between the dies to a temperature greater than 850° C., preferably between 900° and 950°. In this example the dies and integral structure are heated to 925° C. Argon is introduced into the interior of the integral structure between the adjacent sheets, so as to force the sheets apart in the areas which have stop off and to force the parted portions of the outer sheets into the respective die shapes which produce an internal structure dependent upon the pattern of the applied stop off.

The magnitude of the movement of at least one of the sheets during deformation, is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught in long published text books. The method ensures that the metal is subjected to that strain rate which will achieve the maximum permissible speed of extension at any given point in the procedure. The rate of application, and/or the volume of the gas pulses may thus vary during the expansion of the sheets.

On completion of superplastic forming, the inert argon atmosphere and the gas pressure within the integral structure is maintained whilst the structure is cooled to room temperature. The integral structure is then removed from the autoclave and the piping removed. This integral structure may be the finished article, or some final machining of the integral structure may be required to produce the finished article.

In an alternative method, the stack 48 is prepared in the same manner as described previously. The stack 48 is then placed in a combined vacuum chamber and autoclave, which will be more fully described later in this specification. The combined vacuum chamber and autoclave is evacuated and the struck is heated to a temperature between 250° C. and 350° C. to evaporate the binder from the stop off. During the baking out of the binder, the combined vacuum chamber and autoclave is continuously evacuated to remove the binder from between the sheets and from the combined vacuum chamber and autoclave. After the binder has been removed, the edges of the titanium sheets are welded together, in this example by an electron beam, to provide a sealed assembly.

The temperature in the combined vacuum chamber and autoclave is increased such that the sealed assembly is heated to a temperature greater than 850° C. and the argon pressure in the autoclave is raised to greater than 294 pounds per square inch ($20.26 \times 10^5$ $Nm^{-2}$) and held at that temperature and pressure for a predetermined time. Preferably the sealed assembly is heated to between 900° C. and 950° C. and the pressure is between 294 pounds per square inch ($20.26 \times 10^5$ $Nm^{-2}$) and 441 pounds per square inch ($30.39 \times 10^5$ $Nm^{-2}$). The pressure is then reduced to ambient, diffusion bonding having been achieved and the sealed assembly, which is then an integral structure is removed.

The use of the combined vacuum chamber and autoclave dispenses with the requirement to move the sealed assembly from the vacuum chamber to an autoclave for subsequent diffusion bonding. This has the advantage that there is no movement of the sealed assembly and hence no possibility of damage to the stop off whilst it is brittle between the baking out step and the diffusion bonding steps.

Following diffusion bonding the integral structure is processed in the same manner as described previously.

A vacuum chamber 10, for use in processing the metal sheets for superplastic forming and diffusion bonding in the first method described above, is shown in FIGS. 1 and 2. The vacuum chamber 10 comprises a main portion 12 and a second portion 14. A pump 16 is connected to the interior of the vacuum chamber 10 via a pipe 18 in order to evacuate the vacuum chamber 10.

An electron beam gun 20, is located in the second portion 14 of the vacuum chamber 10, and is arranged to direct its electron beam into the main portion 12 of the vacuum chamber 10.

A worktable 28 is located in the main portion 12 of the vacuum chamber 10, and the worktable 28 is movable in two mutually perpendicular directions within the main portion 12 of the vacuum chamber 10 by a mechanism 30. The stack 48, of sheets 50,52 and 54, iS locatable on the worktable 28 and is movable by means of the mechanism 30 to traverse the edges of the sheets 50,52 and 54 into the path of the electron beam to weld the edges together to form the sealed assembly.

Heating devices 22 are provided within the main portion 12 of the vacuum chamber 10 to heat the stack 48 of sheets 50,52 and 54, before the edges of the sheets 50,52 and 54 are welded together, to evaporate the binder from the stop off applied to the surfaces of the sheets. The heating devices 22 in this example are located above the worktable 28 and mechanism 30, and the heating devices 22 comprise a plurality of radiant heating elements 24. A plurality of reflectors 26 are also provided above the radiant heating elements 24 to redirect radiant heat emitted in an upwards direction downwards onto the stack 28.

The worktable 28 is movable in a first direction relative to a first base member 38, and the worktable 28 and first base member 38 are movable in a second direction relative to a second base member 46. The worktable 28 has a first pair of members 32A which have coaxial threaded apertures through which a first externally threaded rod 34A extends. The ends of the first rod 34A are rotatably mounted in a first pair of coaxial apertures in end members 36A on the first base member 38. The worktable 28 also has a second pair of members 32A which have coaxial threaded apertures through which a second externally threaded rod 34B extends. The ends of the second rod 34B are rotatably mounted in a second pair of coaxial apertures in the end members 36B on the first base member 38. The first base member 38 has a third pair of members 40a which have coaxial threaded apertures through which a third externally threaded rod 42A passes. The ends of the third rod 42A are rotatably mounted in a first pair of coaxial apertures in end members 44A on the second base member 46. The first base member 38 has a fourth pair of members 40B which have coaxial threaded apertures through which a fourth externally threaded rod 42B passes. The ends of the fourth rod 42B are rotatably mounted in a second pair of coaxial apertures in end members 44B on the second base member 46.

Suitable motors (not shown) or other suitable means are provided to rotate the rods 34A,34B,42A and 42B to move the worktable 28 such that it moves the edges of the stack 48 of sheets in the electron beam to weld the edges of the stack together.

Figure 1:
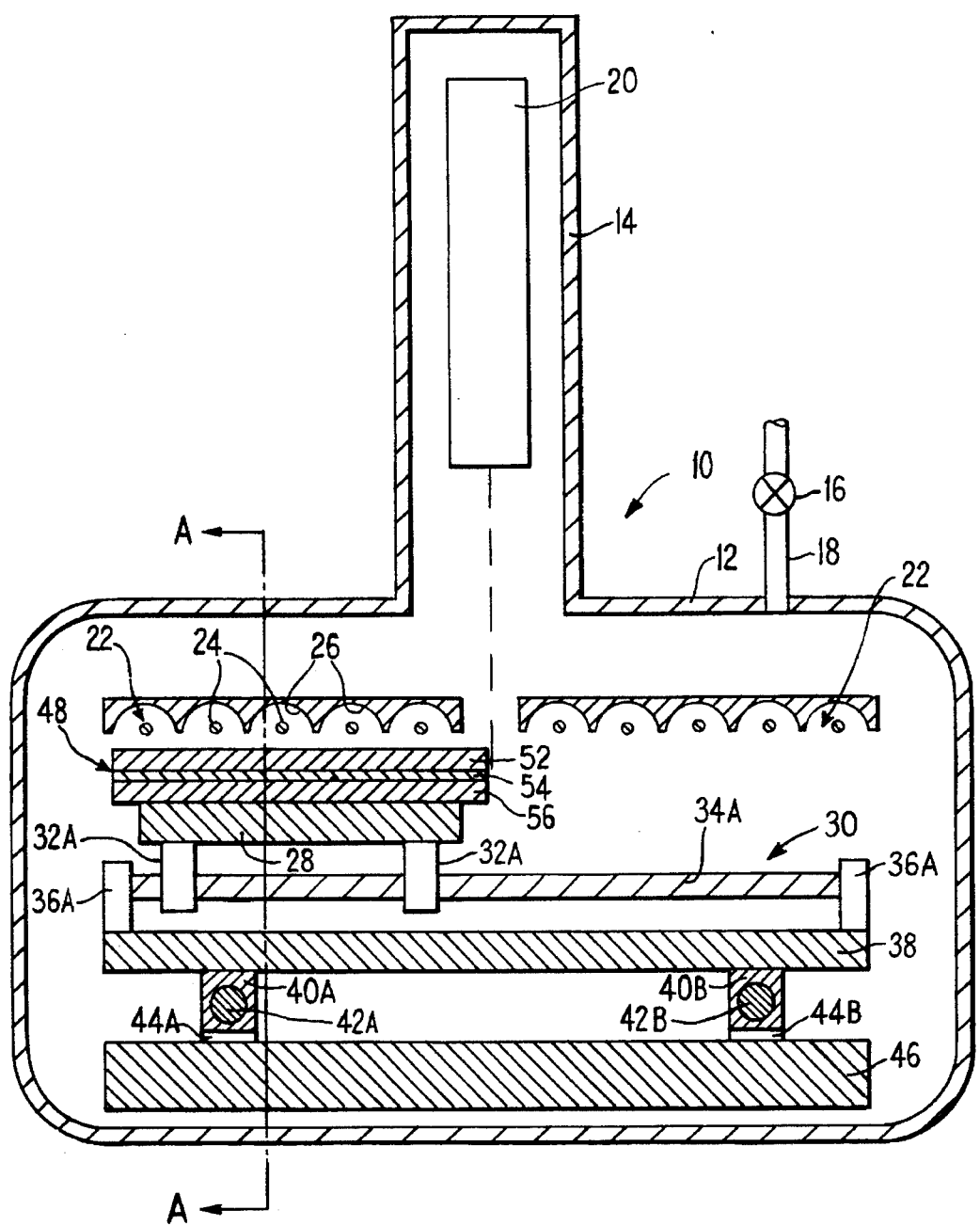
FIG. 1 is a sectional view through a vacuum chamber for use in processing metal workpieces for superplastic forming and diffusion bonding according to the present invention.
Figure 2:
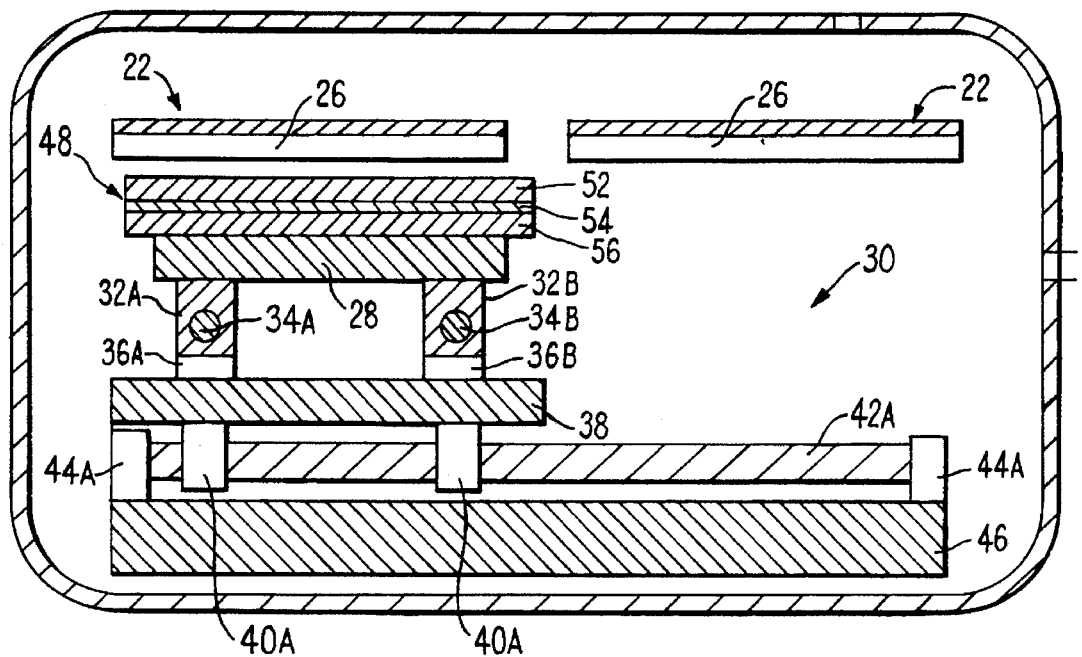
FIG. 2 is a cross-sectional view in the direction of arrows A in FIG. 1.

The vacuum chamber 10 in FIGS. 1 and 2 is designed for use with a range of pressures from a vacuum to atmospheric pressure.

Figure 3:
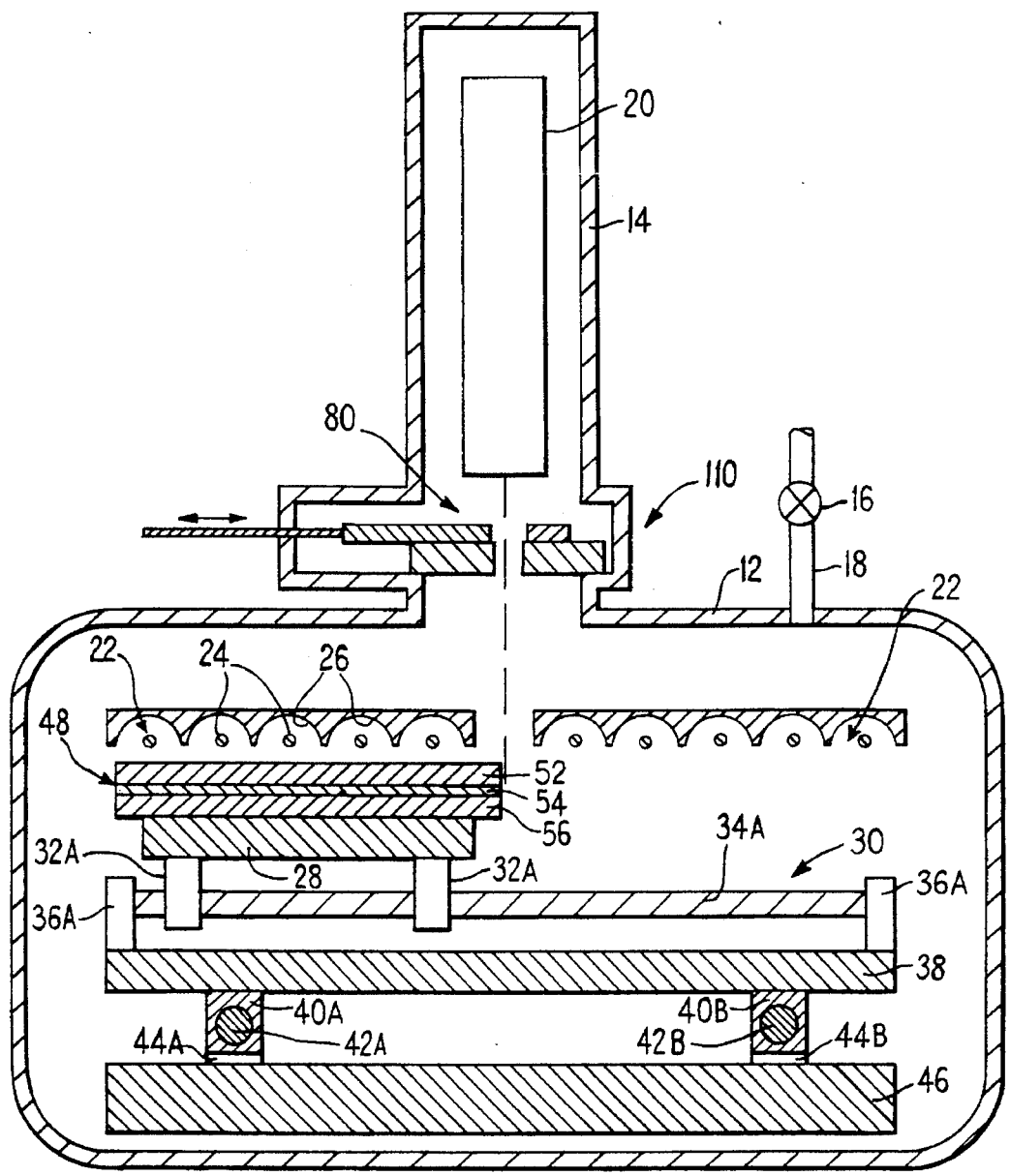
FIG. 3 is a sectional view through an alternative vacuum chamber for use in processing metal workpieces for superplastic forming and diffusion bonding and for diffusion bonding the metal workpieces according to the present invention.

A combined vacuum chamber and autoclave 110, for use in processing the metal sheets for superplastic forming and diffusion bonding in the second method described above, is shown in FIG. 3. The combined vacuum chamber and autoclave has a pressure vessel designed for use with a range of pressures from a vacuum to at least 294 pounds per square inch ($20.26 \times 10^5$ Nm$^{-2}$) and preferably contains pressures up to 441 pounds per square inch ($30.39 \times 10^5$ Nm$^{-2}$).

The combined vacuum chamber and autoclave 110 comprises a main portion 12 and a second portion 14. A pump 16 is connected to the interior of the combined vacuum chamber and autoclave 110 via a pipe 18 in order to evacuate the combined vacuum chamber and autoclave and to supply argon gas to pressure the combined vacuum chamber and autoclave.

The combined vacuum chamber and autoclave 110 is similar to that in FIGS. 1 and 2 and has an electron beam gun 20 located in the second portion 14 arranged to direct its electron beam into the main portion 12. A worktable 18, located in the main portion 12, is movable in two mutually perpendicular directions within the main portion 12 by a mechanism 30. The mechanism 30 is identical to that in FIGS. 1 and 2. The stack 48 of sheets is locatable on the worktable 28 and is movable by means of the worktable 28 and mechanism 30 to move the edges of the sheets 50,52 and 54 into the path of the electron beam to weld the edges together to form the sealed assembly.

Heating devices 22 identical to those in FIGS. 1 and 2 are also provided, to evaporate the binder from the stop off applied to the surface of the sheets.

The combined vacuum chamber and autoclave 110 also has a valve 80 to isolate the second portion 14, and hence the electron beam gun 20, from the main portion 12 of the combined vacuum chamber and autoclave 110 while the main portion 12 is heated and pressurized to diffusion bond the sheets in the stack together. This prevents the electron beam gun being damaged by the high temperatures and/or high pressures present during the diffusion bonding step. The valve 80 may also be used to isolate the second portion 14, and electron beam gun 20, from the main portion 12 during the baking out of the binder from the stack 48.

The vacuum chamber 10 in FIGS. 1 and 2 may also be provided with a valve to isolate the second portion 14, and electron beam gun 20, from the main portion 12 during the baking out of the binder from the stack 48.

Figure 5:
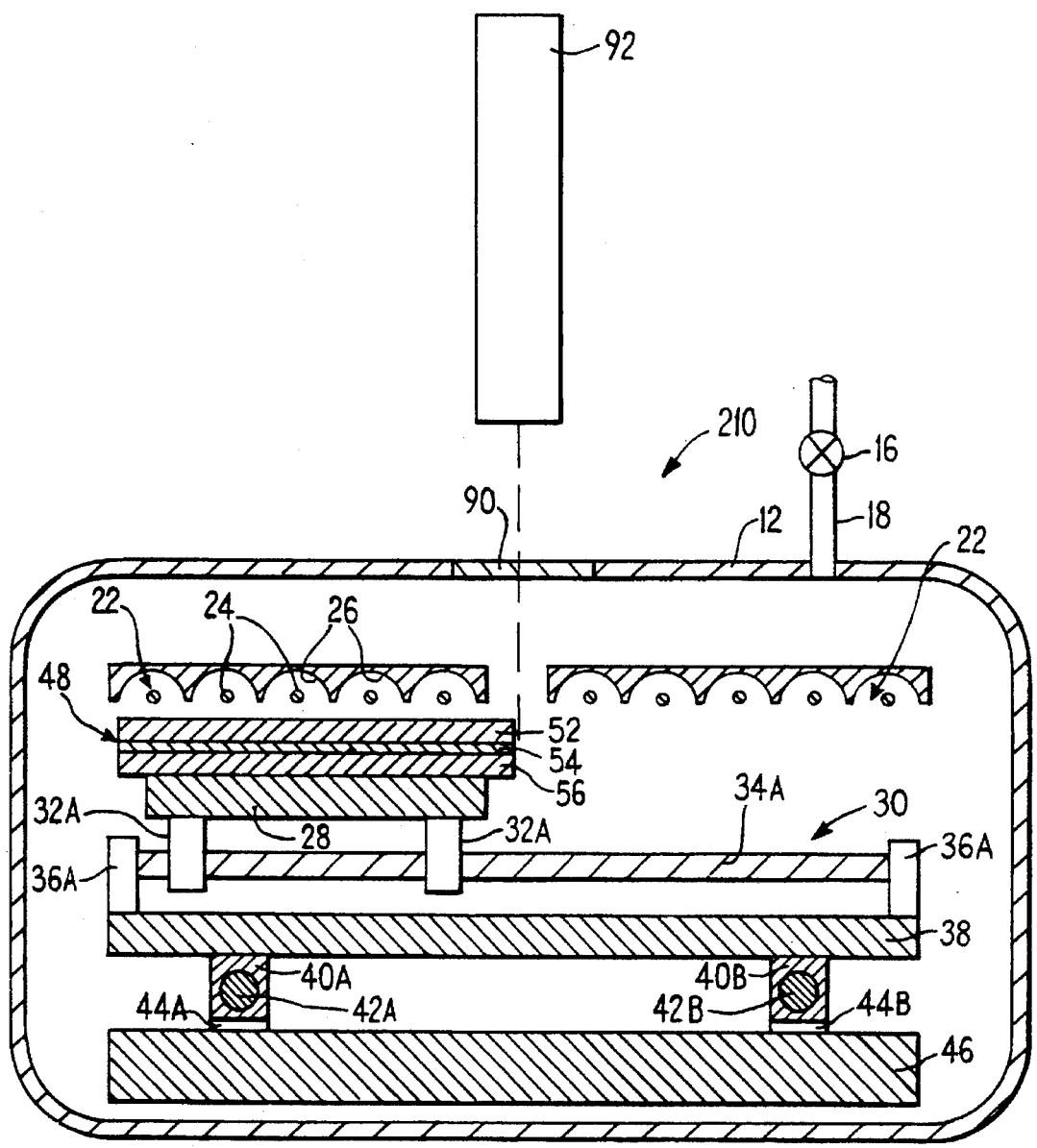
FIG. 5 is a sectional view through a further vacuum chamber for use in processing metal workpieces for superplastic forming and diffusion bonding according to the present inventions.

A further vacuum chamber 210, for use in processing the metal sheets for superplastic forming and diffusion bonding in the first method described is shown in FIG. 5. The vacuum chamber 210 comprises a pump 16 connected to the interior of the vacuum chamber 210 by a pipe 18 in order to evacuate the vacuum chamber 210.

The vacuum chamber 210 is similar to that in FIGS. 1 and 2, but the vacuum chamber 210 does not have a second portion nor an electron beam gun. Instead the vacuum chamber 210 is provided with a window 90 through which a laser beam from a laser beam gun 92 is arranged to be directed into the vacuum chamber 210.

The worktable 28 is movable relative to the path of the laser beam to weld the edges of the sheets together to form the sealed assembly.

Alternatively an optical system may be used to deflect the laser beam to weld the edges of the sheets together, or a combination of beam deflection and movement of the worktable may be used.

Other suitable heating devices may be used, for example inductive heating coils may be located in the upper surface of the worktable 28 to restrict the heating to the stack 48 of sheets placed on the worktable.

Other welding techniques capable of use in a vacuum may be used to weld the edges of the workpieces.

Although the description has referred to titanium sheets or titanium workpieces the present invention is equally applicable to workpieces of other elementary metals, metal alloys and metal matrix composites which are diffusion bondable and one of the workpieces must be capable of superplastic extension. Aluminium and stainless steel are capable of superplastic extension at suitable temperatures and pressures.

The method is suitable for manufacturing heat exchangers, components for turbomachines, for example fan blades, fan duct outlet guide vanes etc.

Although the description has referred to a stack of three metal sheets it is possible to use stacks comprising two metal sheets or stacks comprising four or more metal sheets depending upon the particular article to be manufactured.

I claim:

1. A vacuum chamber for use in processing at least two metal workpieces for diffusion bonding and superplastic forming, the workpieces having edges and being arranged in a stack with a stop off material applied to a mating surface between the workpieces, the stop off material including a volatile binder, said chamber, comprising pump means arranged to evacuate the vacuum chamber, an energy beam welding means disposed to direct a welding beam into said chamber along a path, heater means arranged to directly heat the stack of at least two metal workpieces placed in the vacuum chamber to evaporate the volatile binder from the stop off material applied to preselected areas of at least one of the mating surfaces of the metal workpieces, means arranged to cause relative movement between said path of said welding beam of the energy beam welding means and the stack of workpieces placed in the vacuum chamber to allow the edges of the at least two metal workpieces to be welded together.

2. A vacuum chamber as claimed in claim 1 in which the means to cause relative movement between the welding beam and the stack of workpieces comprises a worktable movable in two mutually perpendicular directions, the stack of workpieces is locatable on the worktable.

3. A vacuum chamber as claimed in claim 1 in which the energy beam welding means comprises an electron beam gun.

4. A vacuum chamber as claimed in claim 3, wherein the vacuum chamber comprises a first portion, said means arranged to cause relative movement comprises a worktable, said worktable and heater means are located in said first portion, and a second portion in which the electron beam gun is located.

5. A vacuum chamber as claimed in claim 4 in which valve means positioned between the first and second portions selectively isolates the electron beam gun from the first portion of the vacuum chamber.

6. A vacuum chamber as claimed in claim 1 in which the energy beam welding means comprises a laser beam gun.

7. A vacuum chamber as claimed in claim 1 in which the heater means comprises a plurality of radiant heaters.

8. A vacuum chamber as claimed in claim 7 in which a plurality of reflectors are provided to reflect radiant heat onto the workpieces.

9. A vacuum chamber as claimed in claim 1 in which the heater means comprises a plurality of inductive heaters.

10. A vacuum chamber as claimed in claim 9 in which the inductive heaters are mounted on a worktable.

11. A vacuum chamber as claimed in claim 1 in which monitoring means are provided to monitor the level of binder evacuated from the vacuum chamber.

12. A vacuum chamber as claimed in claim 11 in which a pressure vessel is arranged to contain internal pressures up to 441 lbs. per square inch.

13. A vacuum chamber for use in processing at least two metal workpieces for diffusion bonding and superplastic forming, the workpieces having edges and being arranged in a stack with a stop off material applied to a mating surface between the workpieces, the stop off material including a volatile binder, said chamber comprising pump means arranged to evacuate the vacuum chamber, an energy beam welding means disposed to direct a welding beam into said chamber along a path, heater means arranged to directly heat the stack of at least two metal workpieces placed in the vacuum chamber to evaporate the volatile binder from the stop off material applied to preselected areas of at least one of the mating surfaces of the metal workpieces, means arranged to cause relative movement between said path of said welding beam of the energy beam welding means and the stack of workpieces placed in the vacuum chamber to allow the edges of the at least two metal workpieces to be welded together, said vacuum chamber comprising a pressure vessel arranged to contain internal pressures from a vacuum to at least 294 lbs per square inch.

* * * * *